United States Patent [19]
Terekhov

[11] 3,906,931
[45] Sept. 23, 1975

[54] DEVICE FOR THE DETERMINATION AND THE AUTOMATIC REAL TIME COMPUTATION OF THE PARAMETERS OF MAN'S STABILITY OF STANCE

[76] Inventor: Yuriy V. Terekhov, P.S.C. Box 1351, Brooks AFB, Tex. 78235

[22] Filed: June 7, 1973

[21] Appl. No.: 368,033

[52] U.S. Cl................ 128/2 N; 73/141 A; 73/172; 73/432; 128/2 S
[51] Int. Cl......................... A61b 5/00; A61b 5/10
[58] Field of Search. 128/2 S, 2 N, 2.05 B, DIG. 29; 73/141 A, 65, 172, 432; 177/211

[56] References Cited
UNITED STATES PATENTS

| | | | |
|---|---|---|---|
| 2,421,222 | 5/1947 | Schaevitz | 177/211 X |
| 3,076,452 | 2/1963 | Rothe | 128/2.05 B |
| 3,201,983 | 8/1965 | Hebert et al. | 177/211 X |
| 3,304,911 | 2/1967 | Hakata et al. | 128/2 S X |
| 3,370,296 | 2/1968 | Greenberg | 73/379 X |
| 3,398,581 | 8/1968 | DeLucia | 73/379 |
| 3,616,690 | 11/1971 | Harden | 177/211 X |
| 3,712,294 | 1/1973 | Muller | 128/2 S |

*Primary Examiner*—Kyle L. Howell
*Attorney, Agent, or Firm*—Morse, Altman, Oates & Bello

[57] ABSTRACT

In combination with a platform on which a man can stand, and which is supported at spaced positions in resilient members to which strain gauges are affixed, an electronic system is provided for determining real time stability of stance parameters in terms of total amplitude of the man's physiologic gravicenter shifts.

3 Claims, 19 Drawing Figures

```
DATA SHEET FOR THE DETERMINATION OF THE STABILITY OF STANCE PARAMETERS
```

Date________________          Time__________          Case No.__________

1. Subj. Name__________________________.                    2. Age__________

3. Weight__________Kg     4. Height__________cm   5. Sex M[ ]  F[ ]

6. Diagnosis Normal [ ]    Path. [ ]

7. Profession__________________________________________________________

8. Purpose/Research_____________  9. Exp. Procedure__________________

Parameters:  Total amplitude of oscillations in the General Center Of Gravity
             (GCG) of the body in cm (after 30 [ ] or 60 [ ] sec.)

| Oscill. axis | Oscill. direction | Eyes open I | Eyes closed II | Eyes open III | Coeff. A II/I | Coeff. B III/I | Sum of I + II + III | Oscill. freq. per min | Remarks |
|---|---|---|---|---|---|---|---|---|---|
| X |  |  |  |  |  |  |  |  |  |
| Y |  |  |  |  |  |  |  |  |  |
| X + Y |  |  |  |  |  |  |  |  |  |
|  |  |  |  |  |  |  |  |  |  |

Name of investigator__________________

DEVICE FOR THE DETERMINATION AND THE AUTOMATIC REAL TIME COMPUTATION OF THE PARAMETERS OF MAN'S STABILITY OF STANCE

BACKGROUND OF THE INVENTION

It is known that the human body, even that of a motionless standing man, experiences continuous micromotions or variations in stance of which he is unaware. These motions represent front-to-back and side-to-side oscillations, which in turn, represent shifts of physiologic gravicenter (center of gravity of the human body). These are compensatory shifts which assure the maintenance of body equilibrium through the complex, reflex mechanisms of the central nervous system. The amplitude of these oscillations varies not only from subject to subject, but for one and the same subject, in accordance with the subject's physiologic condition at any particular time. The study of man's stability of stance offers important data to specialists in various disciplines—clinical medicine, physiology of the higher nervous system, otolaryngology, aerospace medicine, sport medicine, etc.

In the past, several devices and related equipment have been proposed to study man's stability of stance. Among them is a kymograph which records the motions of different parts of the body or a movable pneumatic platform recording the oscillations of a man standing on it. However, all such prior techniques have lacked a high degree of precision and an adaptability for objective application to practical medicine.

The present apparatus, which may be termed a "statokinetometer", differs from previous apparatus by offering the following advantages: measurements are carried out under normal physiologic conditions and causing no discomfort to the subject or patient; high accuracy of measurements and computation of the stability of stance parameters; real-time computation of the parameters of the stability of stance, yielding numerical data; ease of operation; and extremely simple and brief testing procedures.

SUMMARY OF THE INVENTION

The present invention comprises a platform with sensors and an electronically responsive system for measuring and computing, in real time, the stability of stance parameters of a man standing on the platform. The resulting data yield the total amplitude of man's physiologic gravicenter shifts in the longitudinal and the transverse planes, namely, in terms of X and Y coordinates. The signals generated in the data reduction system are "memorized" by 6 counters which are activated by the program controller in a definite order. The automatic data reduction system eliminates manual, time consuming computation of stability of stance measurements, and makes the stability of stance information available in numerical form immediately at the end of each test. The data reduction system computes the total amplitude of the subject's physiologic gravicenter projection per unit time (cm/min), a new stability of stance parameter offered in accordance with the present invention. Associated with the platform strain gauges, together with an electronically responsive system, a visual readout, and a program sequence controller, which can present light, sound, or other stimuli to the subject during the course of a test. This system allows data output on magnetic tape, strip chart, or other types of recording equipment.

Accordingly, primary objects of the present invention are to provide an electronic system for the real time computation of data to obtain parameters of stability of stance per unit time; in such a system, an operational memory, in the form of a series of electronic counters, for retaining the numerical results of each test; in such a system, a programming device to control the system according to a selected program in such a system, electronic timers to regulate duration of stimuli signals; in such a system, a visual readout for the continuous control of all test phases; in such a system, a platform of new optimal dimensions and optimal material, which will simplify manufacture and thus yield more linear deformation of load elements; in such a system, increased accuracy of the measurements and decreased cost; and a new mounting arrangement of load elements to afford more uniform and linear response and symmetry of axis.

A more specific object of the present invention is to provide, as load elements, a series of rings, the axes of which are parallel to the platform and the peripheries of which support the platform. The structure and organization of the rings are responsible for extremely high reliability and repeatability.

The apparatus of the present invention permits automatic measurement and automatic computation of stability of stance parameters of a subject, and displays the results in numerical data that are useful, for example: in neurological and nuerosurgical clinics for the diagnosis (confirmation or differential diagnosis) of central nervous system diseases, including benign or malignant growths in the brain; in research of the physiology of the higher nervous system and also in the area of otolaryngology (studies of the vestibular function apparatus); in aviation, space, and sport medicine research; in the development of new footwear, on the basis of comfort and of physiologic factors; and in the study, design, and development of new types of artificial limbs in orthopedic practice. Some of the other objects of the present invention are obvious; and some will in part be discussed in the following pages.

The invention accordingly comprises the devices, processes, and systems, together with their parts, steps, and components, which are exemplified in the following disclosure, the scope of which will be indicated in the appended claims.

BRIEF DESCRIPTION OF DRAWINGS

For a fuller understanding of the nature and objects of the present invention reference is made to the following detailed description, which is to be taken together with the accompanying drawings, wherein.

DETAILED DESCRIPTION OF THE PREFERRED EMBODIMENT

Figure 1:
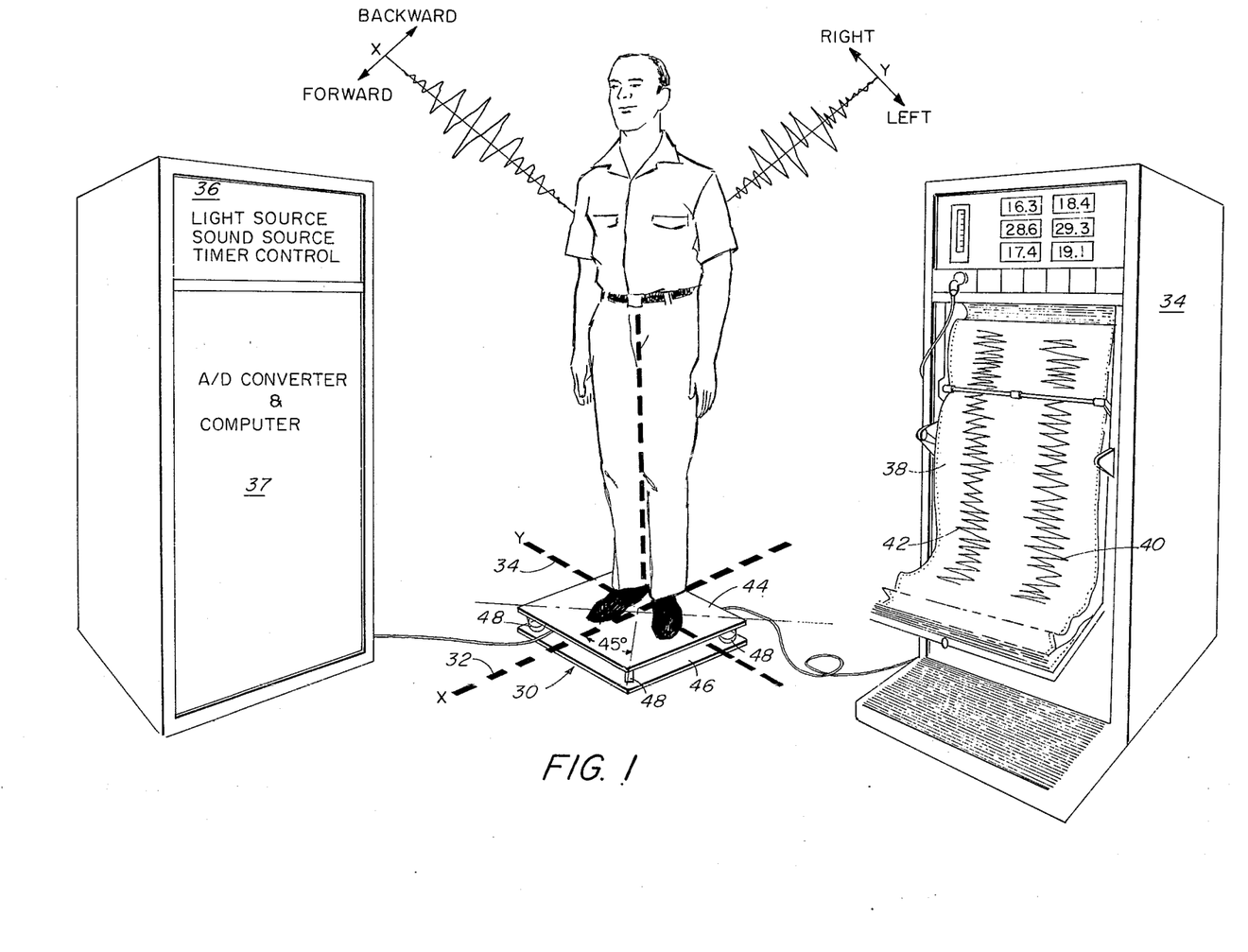
FIG. 1 is a perspective view, illustrating a system of the present invention in actual use.

The system shown in FIG. 1 comprises a gravicenter responsive platform 30 on which a subject stands, a source 36 of physiologic stimuli, a visual readout 34, and a computer readout 37. Source 36 includes visual stimuli (in the form of light sources of different colors and intensities) and audio sources (of different frequencies and intensities) to which the man being tested may be subjected, as well as a timer for varying the duration of light and audio stimuli in accordance with a preselected program. Visual readout 34 is in the form of a strip-chart recorder that produces a continuous record sheet 38 on which X and Y gravicenter movements are presented as separate indicia 42, 40. Computer readout 37 includes an analog to digital converter for receiving analog signals from the gravicenter platform, and a digital computer for processing the resulting digital signals in accordance with a selected program. For example, the computer, which may be any of a variety of types, in one form is a portable Hewlett-Packard 2100 digital computer.

As previously indicated, the function of platform 30 is the transformation of the magnitudes and variations of gravicenter loads along X and Y axes into analog signals. The platform comprises an upper plate 44, a lower plate 46, and at least three rings, 48 which support the upper plate above the lower plate. In the illustrated case, the upper and lower plates are square; and there are four rings, disposed respectively at the four corners of the plates, which are in registered superposition. In alternative embodiments, the plates are circular, oval, rectangular, hexagonal and octagonal. The plates which are composed of metal or plastic, for example, can vary from about 20.0–100.0 cm (8 to 50 inches) in maximum horizontal dimension.

Figure 2:
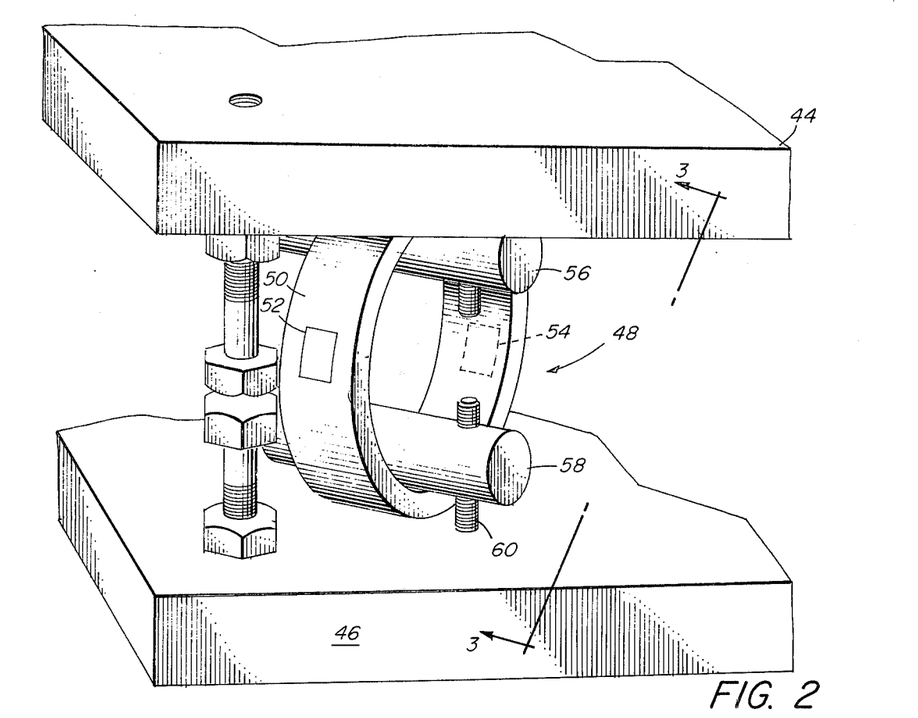
FIG. 2 is a fragmentary detail perspective view of the platform of the system of FIG. 1.
Figure 3:
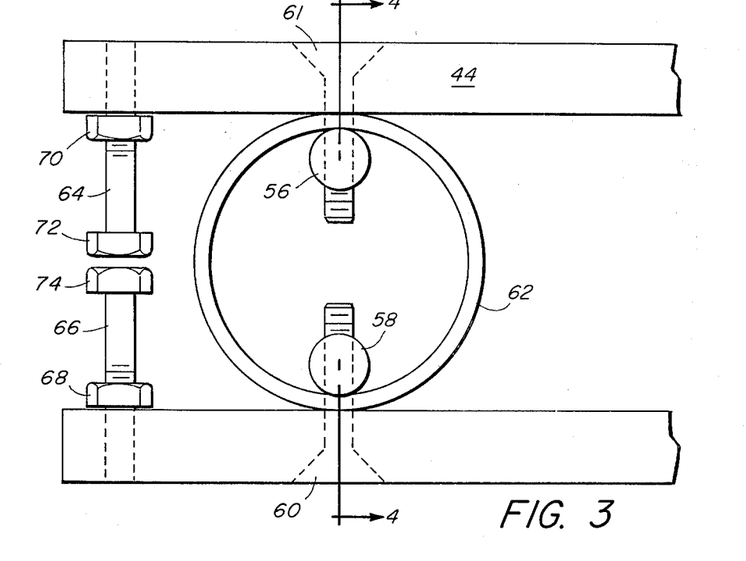
FIG. 3 is a side elevation of the fragment of FIG. 2, taken substantially along the line 3—3 in FIG. 2.
Figure 4:
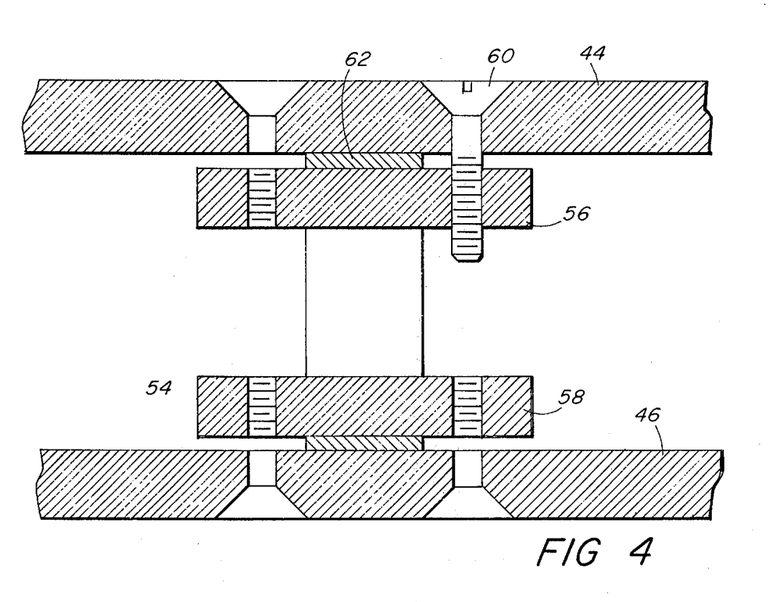
FIG. 4 is a cross sectional view of the fragment of FIG. 3, taken substantially along the line 4—4 in FIG. 3.
Figure 5:
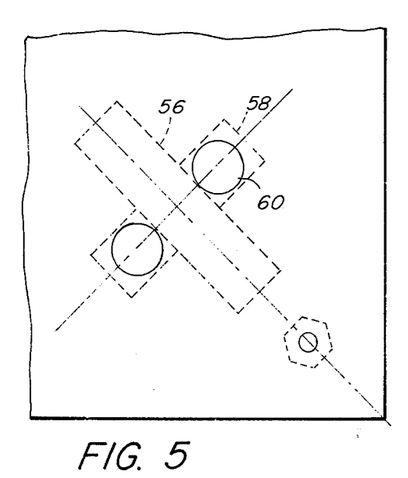
FIG. 5 is a top plan view of the fragment in FIG. 2.
Figure 6:
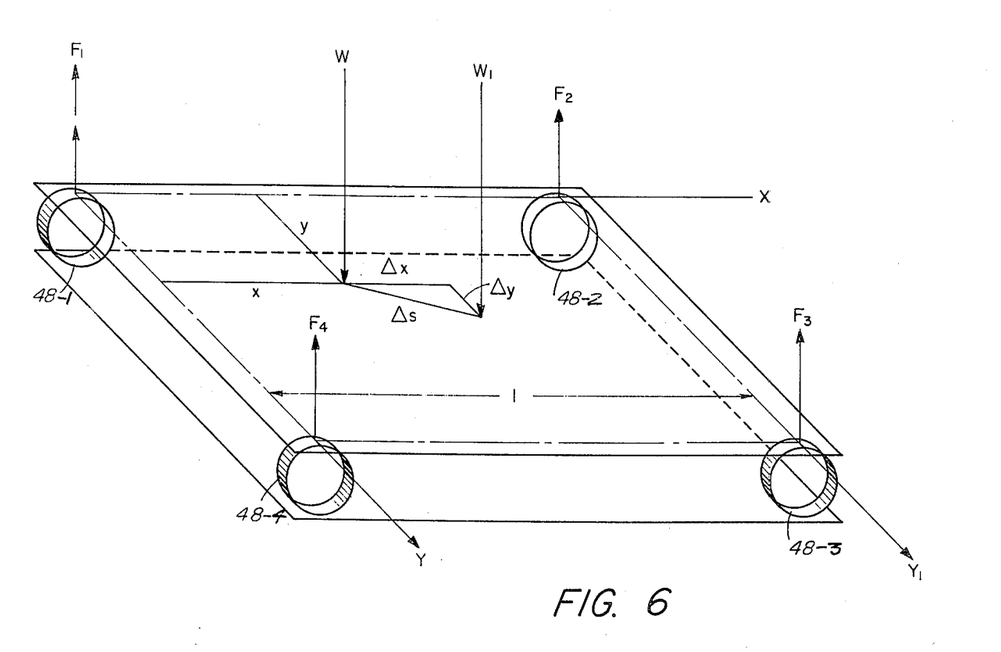
FIG. 6 is a schematic illustration of the platform of FIG. 2, demonstrating the application of forces on the surface of the platform.

As shown in FIG. 2, each ring 48 is positioned with its axis parallel to the planes of plates 44, 46, and perpendicular to a diagonal of the plates, the lower portion of the ring periphery 50 abutting against plate 46 and the upper portion of ring periphery 50 abutting against plate 44. Anchoring the ring to plate 46 is a rod 58, which is fixed to plate 46 by screws 60, 60. Anchoring the ring to plate 44 is a rod 56, which is fixed to plate 44 by screws 61, 61. At the inner and outer portions of ring periphery 50 are a pair of strain gauges 52, 54, respectively. Rings 48, for example, are composed of a resilient metal (such as steel, bronze, aluminum or alloys thereof) or of a resilient plastic (such as nylon or another linear polyamide). Typically, each ring 48 varies in diameter from 2 to 10 centimeters and deforms diametrically under full load from 0.01 to 3.00 millimeters. It will be understood that the spring elements, in other models, are in such alternative forms as helical coils. Typically, each strain gauge, which may be of the extensible wire or semiconductor type, varies in maximum dimension from 5 to 30 millimeters and has an effective resistance that varies from 50 to 450 ohms. Each ring can accept a load up to 80 kilograms without permanent deformation. Typically the entire load on the platform ranges from 70 to 120 kilograms, and the load on each ring ranges from 20 to 30 kilograms. As shown in FIG. 6, shifts from W to $W_1$ in the load $\Delta S$ on the platform result in changes in the respective forces $F_1$, $F_2$, $F_3$, $F_4$ applied across the four rings. In consequence, the vector components $\Delta X$, $\Delta Y$ of the load increment $\Delta S$ are represented by analog signals generated by the pairs of strain gauges affixed to the rings.

The mathematical or theoretical diagram of the platform is given in FIG. 6 which shows the application of forces on its surface. The rings with the strain gages are indicated by 48-1 to 4; the response to the load by $F_a$–$F_b$; the weight of the load by W–$W_1$; the shift of the load projection by $\Delta S$ and its corresponding values for axes X and Y by $\Delta X$ and $\Delta Y$.

Figure 7:
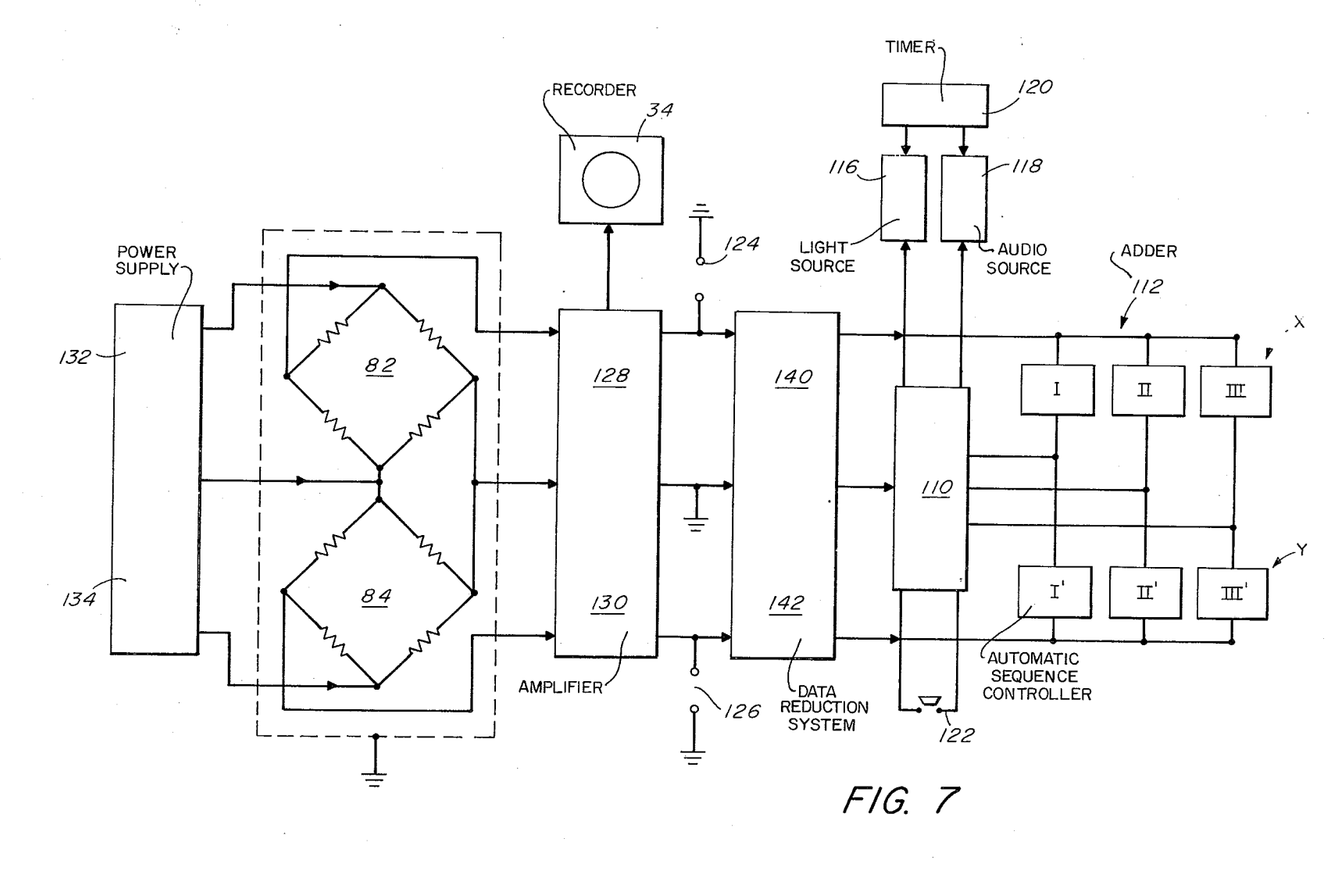
FIG. 7 is a diagram of the electronic configuration of the system of FIG. 1.
Figure 8:
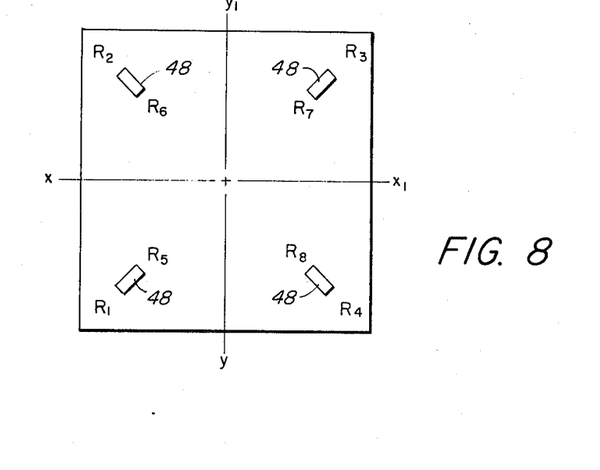
FIG. 8 is a schematic illustrating the mechanical positions of strain gauges, which are included in the electronic configuration of FIG. 7.
Figures 9, 10:
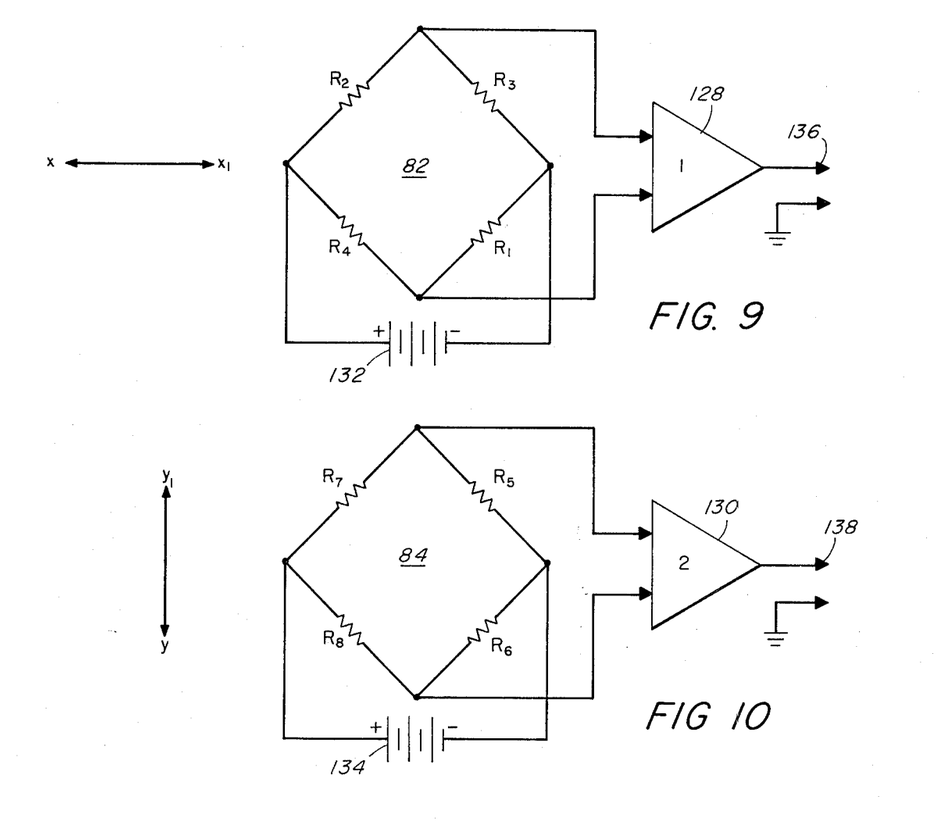
FIG. 9 is a schematic illustrating electrical relationships among certain of the strain gauges of FIG. 8.
FIG. 10 is a schematic illustrating electrical relationships among others of the strain gauges of FIG. 8.

As shown in FIGS. 8, 9, 10, voltage changes in the diagonal sections of the bridge circuit in the X direction are proportional to the sum of the load decrease on sensors 48-1 and 48-4 and the load increases on sensors 48-2 and 48-3 (FIG. 7). This yields:

$$V \cdot K = [\,(F_1 + F_4) - (F_1' + F_4')\,] + [\,(F_2' + F_3') - (F_2 + F_3)\,] \qquad (1)$$

where K is the electrical coefficient, $F_1$, $F_2$, $F_3$, $F_4$ are the sensors' reactions before shifting of load (W), and $F_1'$, $F_2'$, $F_3'$ represent sensors' reaction after shifting of load (W).

Let us assume that reaction to load is concentrated at one single point at the center of each load element, and that the load surface (plate) is completely (absolutely) solid (firm) and placed over the sensors without being anchored down. In this case, from the equation of the force moment related to axis Y (FIG. 1), for the first position, we have $$W \cdot X = (F_2 + F_3)\, 1 \qquad (2)$$

where W is the weight of the shifting load and 1 is the distance between the load elements in the direction of X axis.

The next equation describes the load shift from $P_1$ to $P_2$ over distance $\Delta S$, i.e.

$$W\,(X + X) = (F_2' + F_3')\, 1 \qquad (3)$$

From the equation of the force moments of axis Y, moving parallel to axis Y and across sensors 48-2 and 48-3, for the first position we have:

$$W\,(1 - X) = (F_1 + F_4)\, 1 \qquad (4)$$

and for the second position we have $$W(1 - X - \Delta X) + (F_1' + F_4') \, 1 \qquad (5)$$

Equations (2), (3), (4), and (5) substituted in equation (1) yields:

$$V \cdot K = \frac{2 \, W \, \Delta X}{1} \text{ or } V = \frac{2}{k \cdot 1} \cdot W \, \Delta X \qquad (6)$$

This formula (6) proves that: 1) the information given by the device is directly proportional to load shifts in the corresponding direction; 2) the data obtained (value V) does not depend upon the position of the load on the platform, in fact distance X is not included in the equation.

As shown in FIG. 7, the strain gauges are connected into two bridge circuits 82, 84 — of which, one registers the gravicenter oscillations in the frontal plane; the other, the gravicenter oscillations in the sagittal plane. These bridges are powered by either DC or AC, the latter being at frequencies ranging from 2000 to 10,000 Hertz and at 1.5 to 40.0 volts. Typically these bridges are powered by a 6,000 Hertz, 4-volt generator.

The bridge arrangements of the following strain gauges are illustrated in FIGS. 8, 9, and 10. The outer strain gauges, which constitute bridge 82, are in the mechanical clockwise sequence $R_1$, $R_2$, $R_3$, $R_4$, and in the electrical clockwise sequence $R_2$, $R_3$, $R_1$, $R_4$. The inner strain gauges, which constitute bridge 84, are in the mechanical clockwise sequence $R_6$, $R_7$, $R_8$, $R_5$, and in the electrical clockwise sequence $R_7$, $R_5$, $R_6$, $R_8$. In bridge 82, a power supply 132 is connected across the junctions of $R_2$, $R_4$, and $R_3$, $R_1$; and an output amplifier 128, 136 is connected across the junctions of $R_2$, $R_3$, and $R_4$, $R_1$. In bridge 84, a power supply 134 is connected across the junctions of $R_7$, $R_8$ and $R_5$, $R_6$ and an output amplifier 130, 138 is connected across the junctions of $R_7$, $R_5$ and $R_8$, $R_6$. As shown in FIG. 7, the outputs of amplifiers 128, 130 are fed to a data reduction system 140, 142; and the resulting signals are applied by an automatic sequence controller 110 to two channels of an electronic amplitude adder. Automatic sequence controller 110 also controls the operation of recorder 34, light source 116, audio source 118, and timer 120. Suitable switches 122, 126, respectively, monitor sequence controller 110 and provide an output to computer 37. Incremental movements along the X and Y axes are summed in an adder 112.

Figure 11:
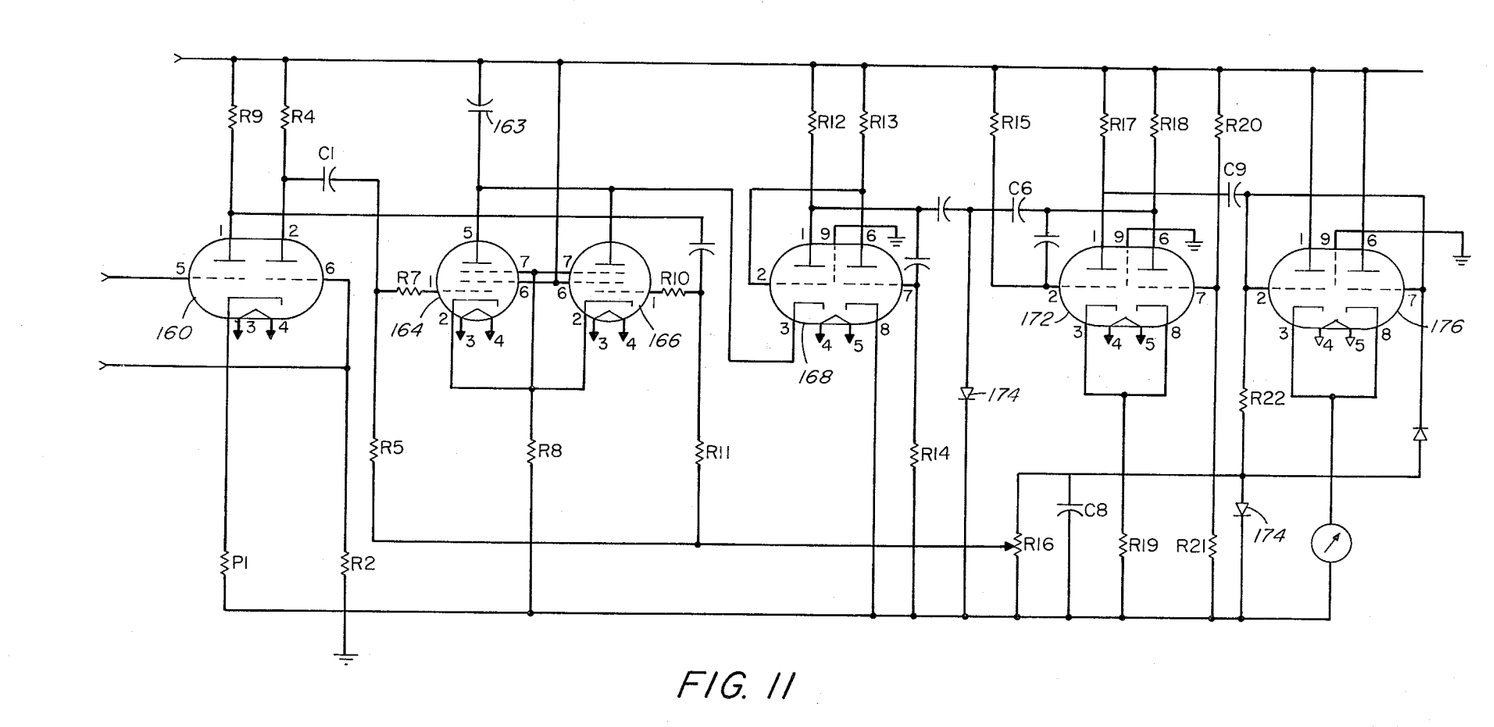
FIG. 11 is an electrical schematic illustrating details of the diagram of FIG. 7.
Figure 12:
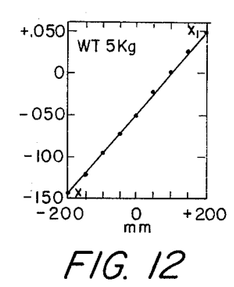
FIG. 12 is a graph illustrating certain principles of the present invention.
Figure 13:
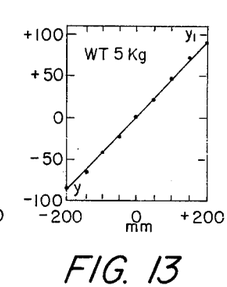
FIG. 13 is a graph illustrating certain principles of the present invention.
Figure 14:
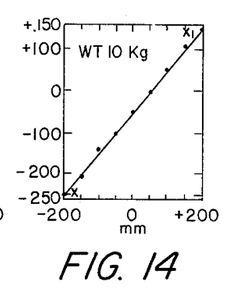
FIG. 14 is a graph illustrating certain principles of the present invention.
Figure 15:
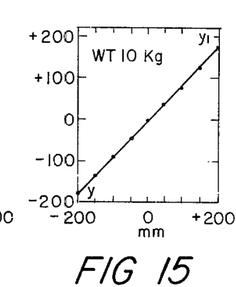
FIG. 15 is a graph illustrating certain principles of the present invention.

The circuit diagram of one channel of amplitude adder 112 is shown in FIG. 11. The input signal is applied through a push-pull amplifier stage 160 to a storage capacitor 163 in association with pair of amplifiers 164, 166. Capacitor 163 is the plate load for these tubes. When the voltage across the capacitor reaches a value that is sufficient to gate an amplifier 168, the current through the latter begins to increase avalanchwise, and the voltage pulse that is produced at the plate in this case is used to trigger a kipp relay 170, 174. The square pulse generated by the kipp relay is fed to the grids of amplifier 176. Its cathode load is an electronic impulse counter which counts the pulses generated by the kipp relay.

The charging rate of the capacitor varies according to the value of the signal fed to the amplitude adder which causes a change in the number of pulses generated by the kipp relay for a certain time interval and, therefore, a change in the readings of the pulse counter for that same period. An experimental check of the dependence of the counter readings upon the value of the input signal shows a linear dependence between them. The frequency response of the amplitude adder ranges from 0.1 to 30 cps.

EXAMPLES

Figure 16A:
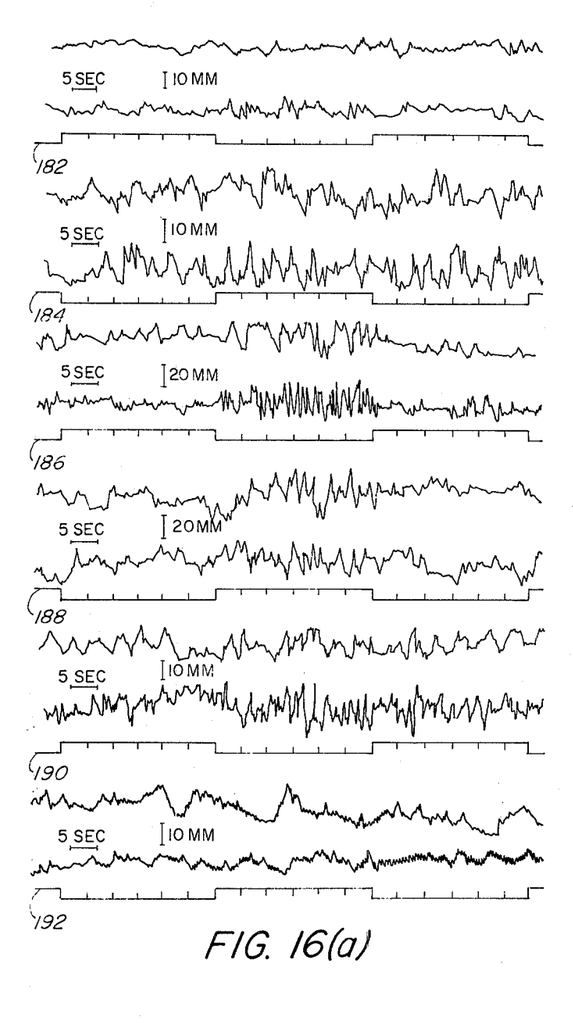
FIGS. 16a and 16b represent a recording illustrating certain results of the present invention.
Figure 16B:
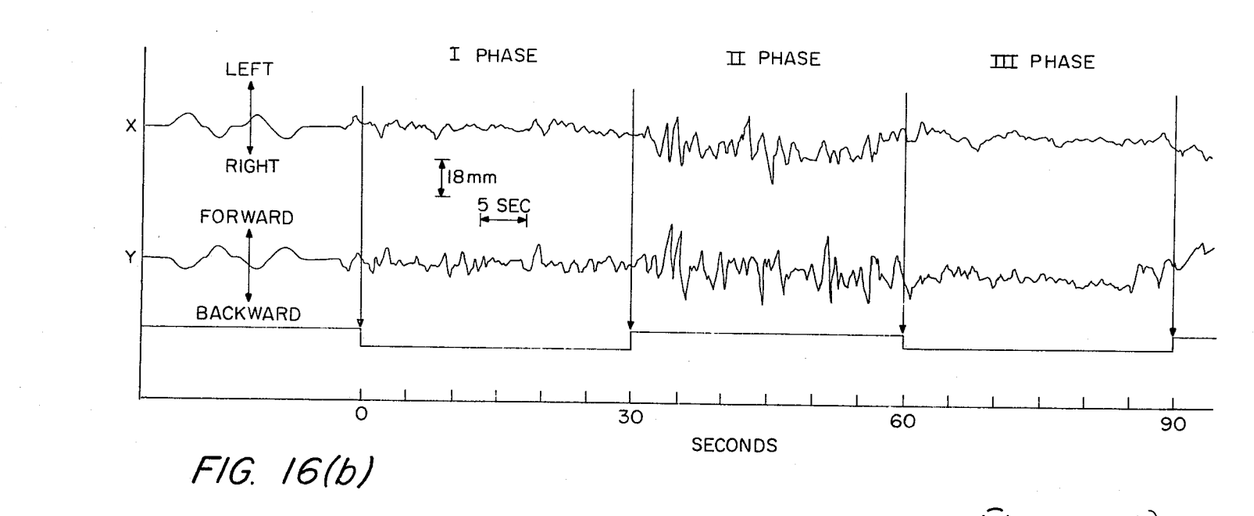
Figure 17:
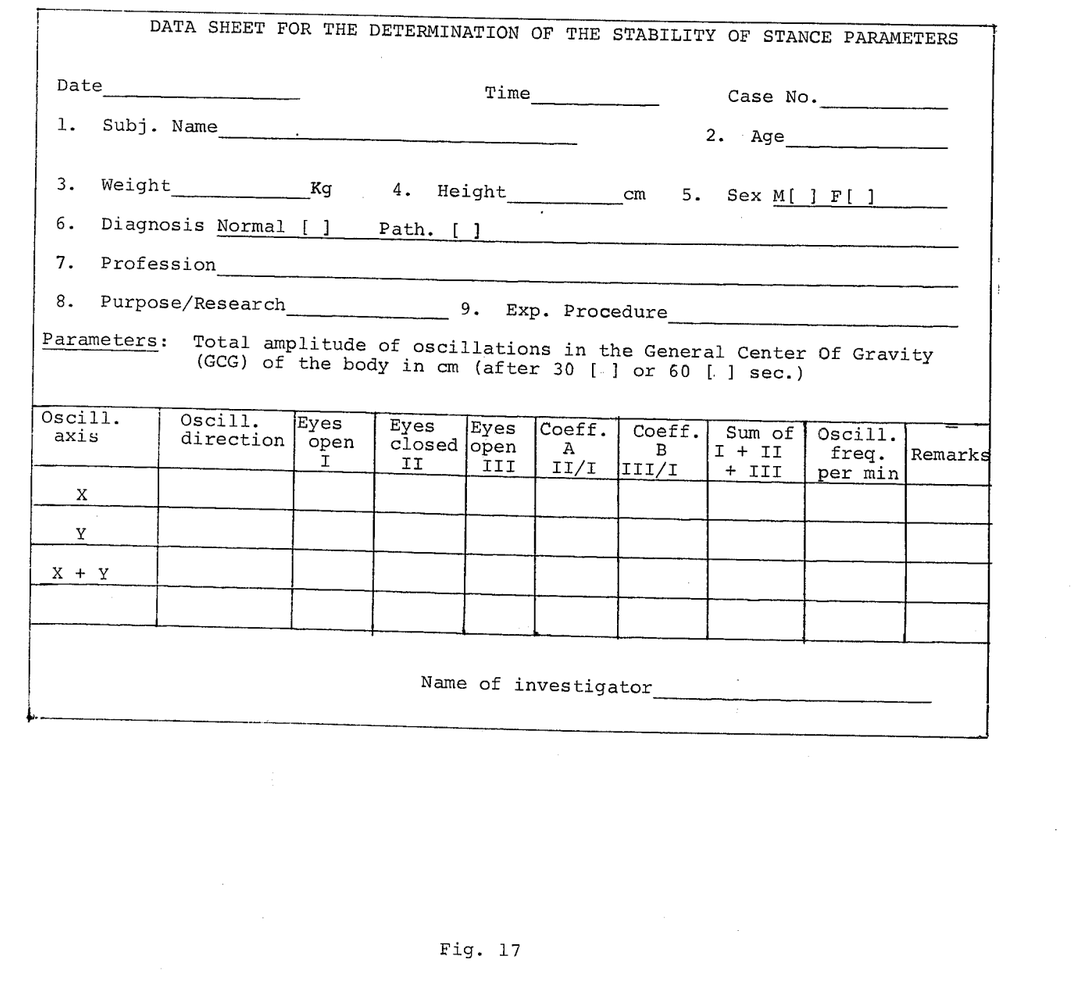
FIG. 17 illustrates a sample of a data sheet useful in accordance with the present invention.
Figure 18:
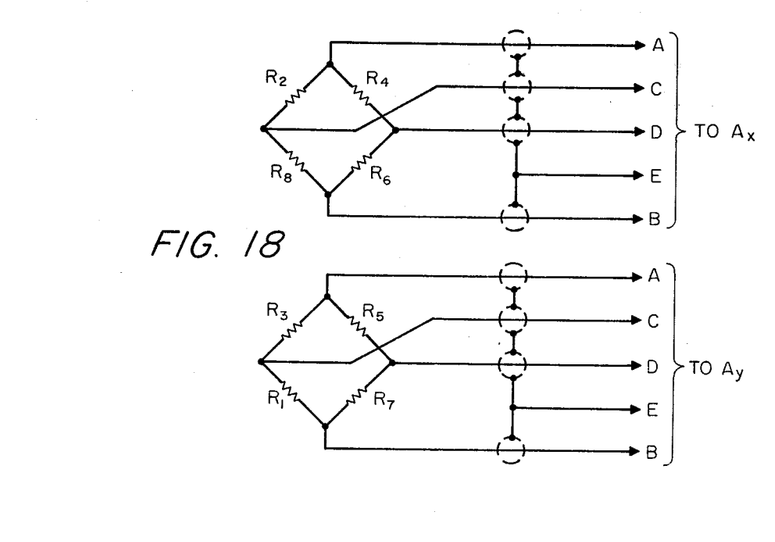
FIG. 18 is a further schematic illustration of strain gauge relationships in accordance with the present invention.

FIG. 16 (a) illustrates typical X and Y strip-chart readouts produced in accordance with the present invention. The X and Y oscillations associated with baseline 182 designate a healty person. The X and Y oscillations associated with baseline 184 designate tumor of the brain. The X and Y oscillations associated with baseline 186 designate tumor of the spinal cord. The X and Y oscillations associated with baseline 188 indicate disseminated sclerosis. The X and Y oscillations associated with base line 190 indicate hypertensive disease. The X and Y oscillations associated with baseline 192 indicate Parkinson's disease. FIG. 16 (b) illustrates typical X and Y strip-chart readouts for a healthy subject, with eyes opened, closed and re-opened. The results obtained with 32 healty subjects (16 men and 16 women) are given in Table I. FIG. 17 is a typical data sheet for use in connection with the information produced.

FIGS. 12, 13, 14, and 15 illustrate the linearity of response of strain gauges in terms of volts with respect to deformation.

OPERATION

The apparatus permits the determination of the degree of the stability of stance of a subject and computes the total amplitude of the oscillations of his physiologic gravicenter per unit time (one minute) in centimeters. This amplitude is directly proportional to the shifts of the physiologic gravicenter of the subject standing on the electronic platform. Before beginning the measurement, it is necessary to calibrate the device by means of calibrating load. Calibration is carried out by rolling the weight, such as a cylindrical form (block of weight), along the platform for a given distance (usually 200 millimeters) in the directions of front-to-back and left-to-right while simultaneously reading the information of the corresponding counters. The counters are then reset. The subject then stands on the electronic platform, the bridges are balanced, and the automatic program sequence controller is actuated.

TABLE I

Total Amplitude of the Oscillations of Man's Gravicenter (in kg/cm/min) in Frontal (A) and Sagittal (B) Planes (Average Data of 32 Tests on Healthy Subjects)

| | | With eyes open Phase I | | With eyes closed Phase II | | With eyes open Phase III | | Ratio of total amplitude of displacements of overall center of gravity with closed eyes to amp of displacements with open eyes (in %) | |
|---|---|---|---|---|---|---|---|---|---|
| | | A | B | A | B | A | B | A | B |
| Men | Oscillation limits | 3.6–14.6 | 7.5–18.3 | 11.6–20.4 | 12.1–25.2 | 9.0–15.4 | 7.7–17.0 | 128–162 | 102–176 |
| | M | 11.1 | 12.9 | 15.7 | 17.8 | 11.3 | 12.8 | 142 | 138 |
| | m± | 0.45 | 0.76 | 0.63 | 0.92 | 0.45 | 0.86 | 2.6 | 5.1 |
| | o± | 1.81 | 3.03 | 2.51 | 3.66 | 1.82 | 3.4 | 10.6 | 20.5 |
| Women | Oscillation limits | 7.0–12.7 | 8.1–15.7 | 9.1–20.6 | 12.7–21.2 | 8.0–15.4 | 7.6–15.1 | 113–204 | 117–178 |
| | M | 10.3 | 12.0 | 15.0 | 18.2 | 11.3 | 11.8 | 153 | 146 |
| | m± | 0.4 | 0.6 | 0.8 | 0.7 | 0.4 | 0.6 | 6.0 | 4.4 |
| | o± | 1.7 | 2.5 | 3.3 | 2.8 | 1.6 | 2.4 | 21.0 | 17.6 |

During appropriate time intervals, this device automatically actuates the counters in the proper order as well as the required light and sound stimuli. After the end of the test, the sequence controller shuts off the apparatus and actuates the light display which shows that the investigation is completed. For example, the first pair of counters (I and I' FIG. 7) memorize the results of the subject's stability of stance, with eyes open, for the duration of 30 seconds. After a short sound signal the subject, having been briefed ahead, shuts his eyes. The second pair of counters (II and II') then memorizes the results during 30 seconds with eyes closed. After the next short sound signal, the subject opens his eyes and the third pair of counters (III and III') fixes the results during the last 30 seconds with eyes open again. In each pair, one counter records the X plane (I, II, III) and the other the Y plane (I', II', III') FIG. 7 so that — immediately after the test is completed — the operator reads from the counters a 6-number figure, representing the total amplitudes of the oscillations of the physiologic gravicenter of the person being tested, and enters it on the data sheet (FIG. 17).

CONCLUSION

The present invention thus provides a device for enabling the automatic real-time computation of the parameters of a man's stability of stance in terms of digital data capable of being processed in a digital computer. As mentioned earlier, the proposed device allows (permits) the automatic measurement and computation of man's parameters of the stability of stance on two planes which are sufficient to solve most of the set tasks. However, for some special investigations an additional number of parameters, characteristic of man's act of standing, can also be measured and analyzed using a special program. These additional parameters are calculated by the computer of the system. For our system, (purpose) we used a portable Hewlett-Packard 2100 digital computer, however the investigator may use any other similar portable computer. The computer allows, for example, one to analyze (calculate) the absolute and the mean frequency oscillations of the physiologic gravicenter of the subject or the patient, in the frontal and saggital planes, for all the phases of the study. The auto and crosscorrelation, the statistical, as well as, other analyses of man's stability of stance are also performed, which greatly broadens the efficiency of the proposed equipment and increases its value. Since certain changes may be made in the foregoing disclosure without departing from the scope of the invention hereof, it is intended that all matter contained in the above description or shown in the accompanying drawings be interpreted in a broad and not in a limiting sense.

What is claimed is:

1. A system for determining a man's real-time stability of stance parameters, said system comprising:
   a. upper platform means disposed substantially along an upper plane for supporting said man;
   b. lower base means disposed substantially along a lower plane below said upper platform means;
   c. at least three rings disposed in contact with said platform means and said base means with their axes generally parallel to said upper plane and said lower plane;
   d. lower connecting means for anchoring lower peripheral portions of said rings to said base means;
   e. upper connecting means for anchoring upper periperal portions of said rings to said platform means;
   f. each of said lower connecting means includes a rod having opposed extremity portions and a medial portion and each of said upper connecting means includes a rod having opposed extremity portions of said rod of said lower connecting means being affixed to said lower base means, said medial portion of said rod of said lower connecting means bearing against a lower portion of one of said rings, said opposed extremity portions of said rod of said upper connecting means being affixed to said upper platform means, said medial portion of said rod of said upper connecting means bearing against an upper portion of said one of said rings, the axes of said rod of said upper connecting means, said rod of said lower connecting means and said one of said rings being parallel to each other;
   g. at least three electrical strain gauges, at least one each of said strain gauges being operatively connected to an intermediate portion of at least one each of said rings; and h. at least one Wheatstone bridge network incorporating said strain gauges for producing electrical signals representing said parameters.

2. The system of claim 1 wherein a plurality of said strain gauges are connected into a first Wheatstone bridge network for generating signals representing X-axis information and a plurality of said strain gauges are connected into a second Wheatstone bridge network for generating signals representing Y-axis information.

3. The system of claim 2 wherein said rings are four in number and said strain gauges are eight in number, two each of said strain gauges being affixed to intermediate opposed portions of one each of said rings, said platform means being substantially rectangular, said rings being located at the four corners of said platform means.

* * * * *